No. 648,165. Patented Apr. 24, 1900.
D. L. FALARDEAU.
SPECTACLES.
(Application filed Dec. 5, 1899.)
(No Model.)
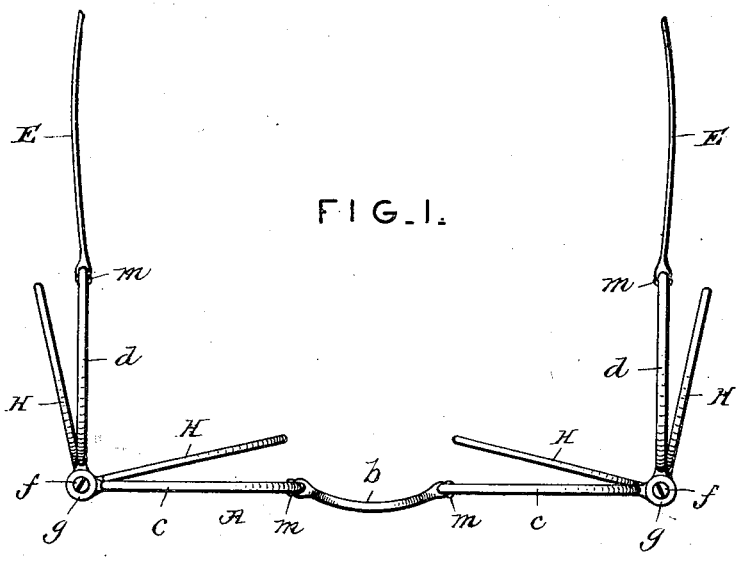
FIG. 1.
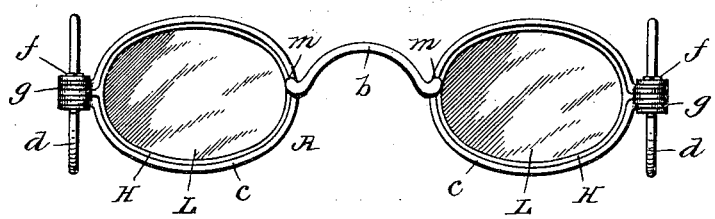
FIG. 2.
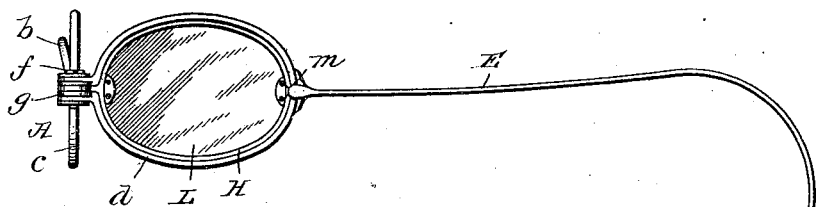
FIG. 3.
FIG. 4.
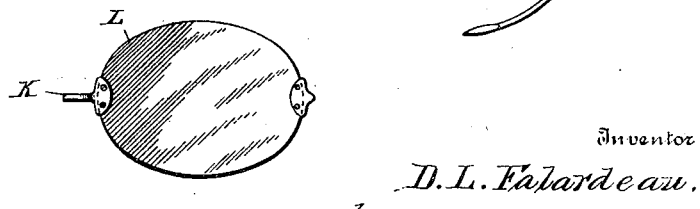
Witnesses
Harry L. Amer,
G. M. Anderson
Inventor
D. L. Falardeau.
by E. W. Anderson
his Attorney
THE NORRIS PETERS CO., PHOTO-LITHO., WASHINGTON, D. C.

UNITED STATES PATENT OFFICE.

DENNIS L. FALARDEAU, OF ALBANY, NEW YORK.

SPECTACLES.

SPECIFICATION forming part of Letters Patent No. 648,165, dated April 24, 1900.

Application filed December 5, 1899. Serial No. 739,272. (No model.)

*To all whom it may concern:*

Be it known that I, DENNIS L. FALARDEAU, a citizen of the United States, and a resident of Albany, in the county of Albany and State of New York, have invented certain new and useful Improvements in Spectacles; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a plan view of the invention, the lenses being shown as out of engagement with the frame. Fig. 2 is a front elevation of same with lenses in place in frame. Fig. 3 is a side elevation of same. Fig. 4 is a detail view of one of the lenses having no frame.

The invention relates to spectacles or vision-glasses; and it consists in the novel construction and combination of parts, as hereinafter set forth.

In the accompanying drawings the letter A designates a frame having the nose-bridge b and front bows c c connected thereto. To the ends of these bows or frames are hinged or otherwise connected lateral or side bows d d of the same inner scope and contour as the front bows. To the ends of these lateral bows in the case of spectacles are secured the temple-bars E E. In other words, the temple-bars are provided with temple-bows at their forward portions normally at right angles, or nearly so, to the front bows. In the case of such eyeglasses as may be made without temple-bars the lateral bows may be rigidly connected to the ends of the front bows in angular relation thereto, and sometimes I may make the side bows rigid with the front bows and hinge the temple-bars to the ends of the side bows. In each case, however, the connection of the front and side bow is provided with a pivot-pin f to engage the lugs g of the lens-frames H or of lens holders or plates K, which are designed to be used when the glasses are without frames.

Both front and side bows are provided with lenses L, having frames or plates, as the case may be, pivoted to said bows at their point of junction. These lenses are in this manner made shiftable—that is to say, the side lens may be shifted by turning its carrier or frame on its pivot from the side bow to the front bow, the front lens being at the same time shifted by turning its frame into the side bow. The lenses or lens-frames should be of proper size and contour to fit neatly in the bows. After the adjustment the lenses are secured in place by means of small catches or holding projections m at the opposite ends of the bows from their junction or pivotal ends.

The invention is designed for elderly persons and others who need lenses of different character for different purposes—such as, for instance, walking or reading. Not only elderly people require different glasses, but those who have short sight need lenses of different focus. Colored lenses are also sometimes required in addition to those of plain glass.

By means of the devices described provision is made for different lenses in such manner that they are easily adjusted for use and conveniently carried when not in use. When the front and side bows are pivoted together, as will usually be the case, the spectacles can be folded in small compass, the front and side bows closing toward each other on each side of the nosepiece, so that the instrument will readily fit in an ordinary spectacle-case.

Having described this invention, what I claim, and desire to secure by Letters Patent, is—

1. A spectacle or eyeglass frame, having temple-bows joined to the temple, in angular relation to the front bows, and provided with pivoted lens-frames or lens-holders, substantially as specified.

2. A spectacle or eyeglass frame, having temple-bows joined to the temples pivoted to the outer ends of the front bows, and to shiftable lens frames or holders, substantially as specified.

3. The combination with the front bows and bridge, of the lateral or temple bows, the temples connected thereto, the pivoted shiftable lens frames or holders, and the catches, substantially as specified.

In testimony whereof I affix my signature in presence of two witnesses.

DENNIS L. FALARDEAU.

Witnesses:
ROSE J. WINGER,
LEONARD M. BENJAMIN.